US012810434B2

(12) United States Patent
Raj et al.

(10) Patent No.: US 12,810,434 B2
(45) Date of Patent: Nov. 24, 2026

(54) OPERATING A DEVICE SUCH AS A VEHICLE WITH MACHINE LEARNING

(71) Applicants: Ford Global Technologies, LLC, Dearborn, MI (US); GEORGIA TECH RESEARCH CORPORATION, Atlanta, GA (US)

(72) Inventors: Amit Raj, Atlanta, GA (US); Akshay Krishnan, Atlanta, GA (US); James Hays, Atlanta, GA (US); Xianling Zhang, San Jose, CA (US); Alexandra Carlson, Palo Alto, CA (US); Nikita Jaipuria, Pittsburgh, PA (US); Sandhya Sridhar, Sunnyvale, CA (US); Nathan Tseng, Canton, MI (US)

(73) Assignees: Ford Global Technologies, LLC, Dearborn, MI (US); Georgia Tech Research Corporation, Atlanta, GA (US)

( * ) Notice: Subject to any disclaimer, the term of this patent is extended or adjusted under 35 U.S.C. 154(b) by 679 days.

(21) Appl. No.: 18/307,889

(22) Filed: Apr. 27, 2023

(65) Prior Publication Data

US 2024/0362793 A1 Oct. 31, 2024

(51) Int. Cl.
*G06T 7/194* (2017.01)
*G06T 15/20* (2011.01)

(52) U.S. Cl.
CPC .............. *G06T 7/194* (2017.01); *G06T 15/20* (2013.01); *G06T 2207/20084* (2013.01)

(58) Field of Classification Search
CPC ......... G06T 15/06; G06T 15/20; G06T 15/50; G06T 15/506; G06T 7/11; G06T 7/194;
(Continued)

(56) References Cited

U.S. PATENT DOCUMENTS 10,949,684 B2 3/2021 Jaipuria et al.
11,138,452 B2 10/2021 Chakravarty et al.
(Continued)

FOREIGN PATENT DOCUMENTS

DE 02021002798 A1 7/2021

OTHER PUBLICATIONS

Xie, Christopher, et al. "Fig-nerf: Figure-ground neural radiance fields for 3d object category modelling." 2021 International Conference on 3D Vision (3DV). IEEE, 2021. (Year: 2021).*
(Continued)

*Primary Examiner* — Gregory A Morse
*Assistant Examiner* — Stefano Anthony Dardano
(74) *Attorney, Agent, or Firm* — Frank A. MacKenzie; Brooks Kushman P.C.

(57) ABSTRACT

A computer that includes a processor and a memory, the memory including instructions executable by the processor to generate background pixels and object pixels and generate background pixel ray data based on the background pixels and object ray pixel data based on the object pixels. The background pixel ray data can be input to a first neural network to generate background neural radiance fields (NeRFs) and the object pixel ray data can be input to a second neural network to generate object NeRFs. An output image can be rendered based on the background NeRFs and the object NeRFs.

20 Claims, 14 Drawing Sheets

(58) Field of Classification Search
CPC ......... G06T 15/80; G06T 17/00; G06T 15/00; G06T 15/08; G06T 2207/30252
See application file for complete search history.

(56) References Cited

U.S. PATENT DOCUMENTS

| | | | | |
|---|---|---|---|---|
| 11,308,659 | B2 | 4/2022 | Duckworth et al. | |
| 2021/0142577 | A1 | 5/2021 | Thomas et al. | |
| 2022/0122001 | A1 | 4/2022 | Choe et al. | |
| 2022/0180528 | A1 | 6/2022 | Dundar et al. | |
| 2024/0273913 | A1* | 8/2024 | Bharadwaj .......... | B60W 60/001 |

OTHER PUBLICATIONS

Rudnev, Viktor, et al. "Nerf for outdoor scene relighting." European Conference on Computer Vision. Cham: Springer Nature Switzerland, 2022. (Year: 2022).*

Wu, Tianhao, et al. "D/\ 2nerf: Self-supervised decoupling of dynamic and static objects from a monocular video." Advances in neural information processing systems 35 (2022): 32653-32666. (Year: 2022).*

Yang, Bangbang, et al. "Learning object-compositional neural radiance field for editable scene rendering." Proceedings of the IEEE/CVF international conference on computer vision. 2021. (Year: 2021).*

Mildenhall, Ben, et al. "Nerf: Representing scenes as neural radiance fields for view synthesis." Communications of the ACM 65.1 (2021): 99-106. (Year: 2021).*

Martin-Brualla, Ricardo, et al. "Nerf in the wild: Neural radiance fields for unconstrained photo collections." Proceedings of the IEEE/CVF conference on computer vision and pattern recognition. 2021. (Year: 2021).*

Toschi, Marco, et al. "Relight my nerf: A dataset for novel view synthesis and relighting of real world objects." Proceedings of the IEEE/CVF conference on computer vision and pattern recognition. 2023. (Year: 2023).*

Ge, Yunhao, et al. "Neural-sim: Learning to generate training data with nerf." European Conference on Computer Vision. Cham: Springer Nature Switzerland, 2022. (Year: 2022).*

Kundu, Abhijit, et al. "Panoptic neural fields: A semantic object-aware neural scene representation." Proceedings of the IEEE/CVF Conference on Computer Vision and Pattern Recognition. 2022. (Year: 2022).*

Nguyen, Thang-Anh-Quan, et al. "Semantically-aware neural radiance fields for visual scene understanding: A comprehensive review." International Journal of Computer Vision 134.3 (2026): 109. (Year: 2026).*

Mirzaei, Ashkan, et al. "Spin-nerf: Multiview segmentation and perceptual inpainting with neural radiance fields." Proceedings of the IEEE/CVF Conference on Computer Vision and Pattern Recognition. 2023. (Year: 2023).*

Cabon, Y. et al., "Virtual Kitti 2," arXiv:2001.10773v1 [cs.CV] Jan. 29, 2020, 11 pages.

Chang, MF., et al., "Argoverse: 3D Tracking and Forecasting with Rich Maps," arXiv:1911.02620v1 [cs.CV] Nov. 6, 2019, 18 pages.

Wang, Y. et al., "Deep learning-based vehicle detection with synthetic image data," IET Intelligent Transport Systems, 2018, 9 pages.

Dosovitskiy, A. et al., "CARLA: An Open Urban Driving Simulator," 1st Conference on Robot Learning, 2017, 16 pages.

Kundu, A., et al., "Panoptic Neural Fields: A Semantic Object-Aware Neural Scene Representation," Computer Vision Foundation, 2022, 11 pages.

Mildenhall, B., et al., NeRF: Representing Scenes as Neural Radiance Fields for View Synthesis, arXiv:2003.08934v2 [cs.CV] Aug. 3, 2020, 25 pages.

Muller, N. et al., "AutoRF: Learning 3D Object Radiance Fields from Single View Observations," arXiv:2204.03593v1 [cs.CV] Apr. 7, 2022, 14 pages.

Mildenhall, B. et al., "NeRF: Representing Scenes as Neural Radiance Fields for View Synthesis," aarXiv:2003.08934v2 [cs.CV] Aug. 3, 2020, 17 pages.

Ost, J., et al., "Neural Scene Graphs for Dynamic Scenes," arXiv:2011.10379v3 [cs.CV] Mar. 5, 2021, 11 pages.

Ravi, N. et al., "Accelerating 3D Deep Learning with PyTorch3D," arXiv:2007.08501v1 [cs.CV] Jul. 16, 2020, 18 pages.

Rematas, K. et al., "Urban Radiance Fields," arXiv:2111.14643v1 [cs.CV] Nov. 29, 2021, 14 pages.

Anonymous authors, "S-NERF: Neural Radiance Fields for Street Views," ICLR, 2023, 25 pages.

Sucar, E. et al., "iMAP: Implicit Mapping and Positioning in Real-Time," Computer Vision Foundation, 2021, 10 pages.

Tancik. M. et al., "Block-NeRF: Scalable Large Scene Neural View Synthesis," arXiv:2202.05263v1 [cs.CV] Feb. 10, 2022, 15 pages.

Tremblay, J. et al., "Training Deep Networks with Synthetic Data: Bridging the Reality Gap by Domain Randomization," arXiv:1804.06516v3 [cs.CV] Apr. 23, 2018, 9 pages.

Zhu, JY., et al., "Visual Object Networks: Image Generation with Disentangled 3D Representation," arXiv:1812.02725v1 [cs.CV] Dec. 6, 2018, 12 pages.

* cited by examiner

OPERATING A DEVICE SUCH AS A VEHICLE WITH MACHINE LEARNING

BACKGROUND

Computers can operate systems and/or devices including vehicles, robots, drones, and/or object tracking systems. Data including images can be acquired by sensors and processed using a computer to determine a location of a system with respect to objects in an environment around the system. The computer can use the location data to determine trajectories for moving a system in the environment. The computer can then determine control data to transmit to system components to control system components to move the system according to the determined trajectories.

DETAILED DESCRIPTION

Figure 1:
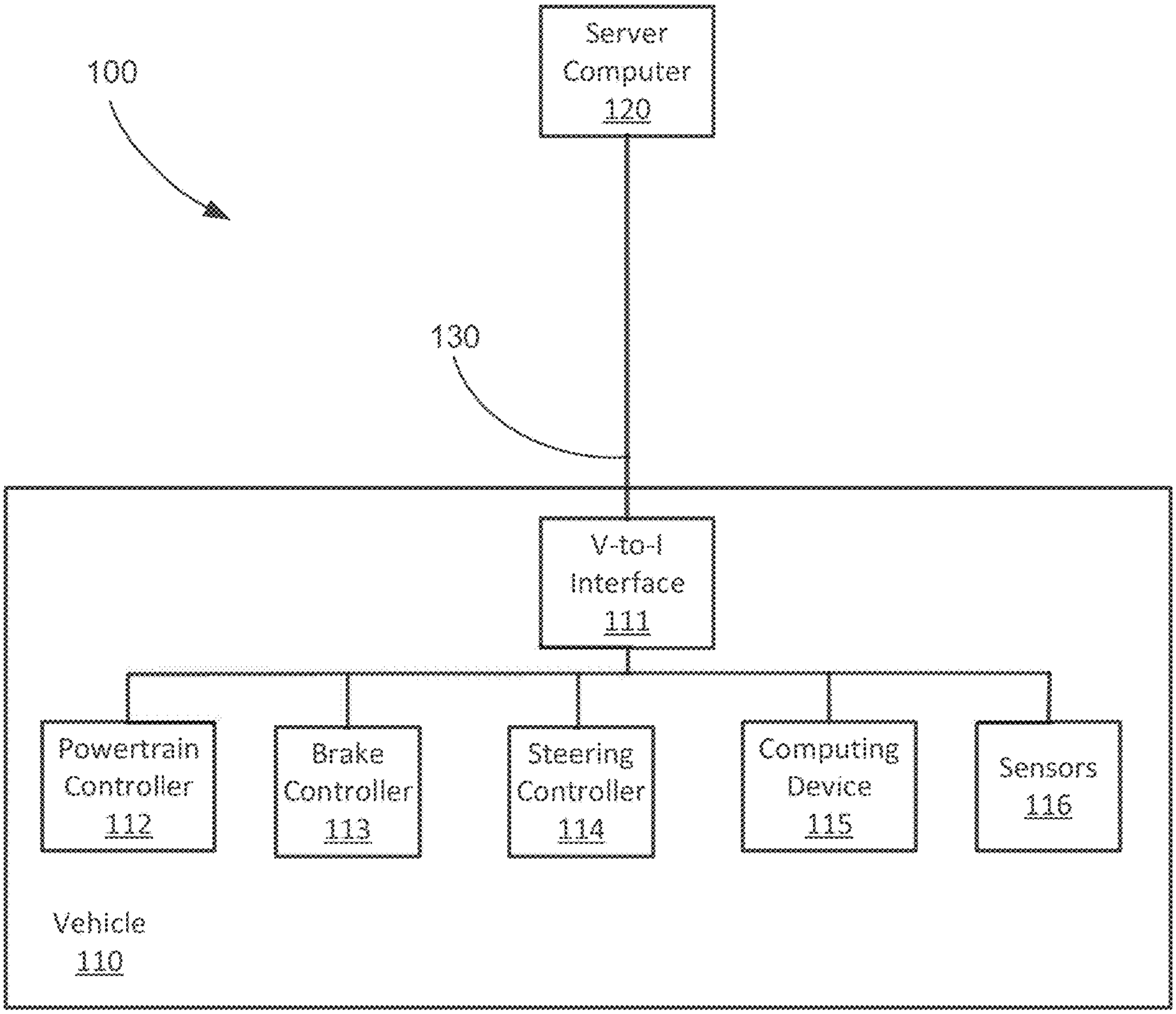
FIG. 1 is a block diagram of an example vehicle system.

Sensing systems including vehicles, robots, drones, etc., can be operated by acquiring sensor data regarding an environment around the system and processing the sensor data to determine a path upon which to operate the system or portions of the system. The sensor data can be processed to detect objects in an environment. The objects can include roadways, buildings, conveyors, vehicles, pedestrians, manufactured parts, etc. The detected object can be used by a computer included in the system to operate the system. For example, a robot can use data regarding a detected object to determine a path for a gripper to pick an object up. A vehicle or drone can use data regarding detected objects to determine a path for operating the vehicle or drone based on locating and identifying an object in an environment around the vehicle or drone.

Neural networks can process sensor data to detect objects in an environment around a system. Neural networks can receive input images and output predictions regarding locations and labels for objects included in the images, for example. Neural networks can be trained to detect objects in images by generating a training dataset of images along with ground truth data that indicates locations and labels for objects included in the images. The performance of a trained neural network can depend upon generating a training dataset that encompasses the variety of different environments that a system will encounter when released “into the wild” for use in a manufactured system. In addition to including examples of different environments, the training datasets can include objects at multiple locations, different illuminations at different times of day ranging from bright sunlight to nighttime, and weather conditions ranging from clear skies through overcast to rain, snow and fog. Acquiring a training dataset that includes a comprehensive sample of real world environments including objects, illumination, weather conditions and ground truth can require a very large effort over a long time period.

Techniques described herein for generating training datasets based on light-aware neural radiance fields (NeRFs) can enhance training neural networks by acquiring video data of environments from a single camera included in a moving system at different time of day and processing the video data to generate light-aware NeRFs for backgrounds and objects separately. A neural radiance field is a set of radiance functions that describe a physical space or object. A radiance function is a five dimensional (5D) function that describes the radiance of a point in space in terms of its three dimensional (3D) x, y, and z location coordinates and 2D viewing angle in $\theta,\varphi$ rotational coordinates generated by a neural network. Radiance includes the color, intensity and opacity of a point in space. A light-aware NeRF includes data regarding the location and strength of solar illumination with respect to the NeRF. The background and object NeRFs can be combined to generate reconstructed images that include backgrounds viewed from multiple points of view that include multiple combinations of objects located at multiple locations. The reconstructed images can include multiple illuminations at multiple times of day under multiple types of weather. Because the points of view of the background and the locations and labels of the objects are determined at reconstruction time, ground truth for the reconstructed image is typically available without further processing.

A vehicle is used herein as a non-limiting example of a system including a sensing sub-system. A computing device included in a vehicle can acquire sensor data including video, lidar, radar, and ultrasound data. The sensor data can be processed by the computer locating and identifying objects in an environment around the vehicle. For example, a video camera included in a vehicle can acquire video images and process the images to detect dynamic objects. Dynamic objects are objects such as vehicles and pedestrians that can change locations during a single data acquisition pass or during subsequent data acquisition passes over the same scene. Light-aware NeRFs can be used to generate multiple images with dynamic objects at multiple locations with multiple illuminations and weather combinations. Because a light-aware NeRF system includes data regarding the real world point of view that was used to generate images and data regarding real world locations of the dynamic objects, ground truth location data used to train machine learning systems is typically available with no further processing.

The computing device in the vehicle can use the object location and label to determine a vehicle path, for example. A vehicle can operate on a roadway based on a vehicle path by determining commands to direct the vehicle’s powertrain, braking, and steering components to operate the vehicle so as to travel along the path. A vehicle path is typically a polynomial function upon which a vehicle can be operated. Sometimes referred to as a path polynomial, the polynomial function can specify a vehicle location (e.g., according to x, y and z coordinates) and/or pose (e.g., roll, pitch, and yaw), over time. That is, the path polynomial can be a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

The polynomial function can be used to direct a vehicle from a current location indicated by vehicle sensors to another location in an environment around the vehicle while maintaining minimum and maximum limits on lateral and longitudinal accelerations. A vehicle can be operated along a vehicle path by transmitting commands to vehicle controllers to control vehicle propulsion, steering and brakes. A computing device in a vehicle can detect object locations and labels and use data regarding the detected objects to determine a vehicle path. For example, data regarding other vehicles in an environment around a vehicle can be used by the computing device to maintain minimum distances between vehicles in traffic or direct lane-changing maneuvers.

A method is disclosed herein, including generating background pixels and object pixels and generating background pixel ray data based on the background pixels and object ray pixel data based on the object pixels. Background pixel ray data can be input to a first neural network to generate background neural radiance fields (NeRFs) and the object pixel ray data can be input to a second neural network to generate object NeRFs. An output image can be rendered based on the background NeRFs and the object NeRFs. The output image can be rendered based on a selected point of view, an illumination, and a weather condition. The point of view can be selected to render the output image includes a 3D viewing location in x, y, and z location coordinates and direction in θ,φ rotational coordinates. The image segmentor can be a third neural network. The first neural network and the second neural network can include fully connected layers. The background NeRFs and the object NeRFs can be five-dimensional (5D) radiance functions that include the radiance at multiple directions (θ,φ) at a three-dimensional (3D) point (x, y, z), wherein the radiance functions include color, intensity and opacity.

Rendering the output image can include determining the 5D radiance functions along rays to a selected point of view. The radiance functions can include a location, a direction, an intensity and a color of a selected point. Rendering the output image can include selecting the object included in the output image includes selecting an object location in x, y, and z location coordinates and direction in θ,φ rotational coordinates, selecting an object color, and selecting illumination. Rendering the output image can include rendering the object illumination to match the background scene illumination at different locations of the object. The output images can be output to a second computing system that is used to train a neural network using the rendered output images. The trained neural network can output to a third computing system in a vehicle. Memory included in the third computing system can include instructions that are used to operate the vehicle by determining a vehicle path. The vehicle can be operated by the third computing system by controlling vehicle steering, vehicle propulsion, and vehicle brakes.

Further disclosed is a computer readable medium, storing program instructions for executing some or all of the above method steps. Further disclosed is a computer programmed for executing some or all of the above method steps, including a computer apparatus, programmed to generate background pixels and object pixels and generate background pixel ray data based on the background pixels and object ray pixel data based on the object pixels. Background pixel ray data can be input to a first neural network to generate background neural radiance fields (NeRFs) and the object pixel ray data can be input to a second neural network to generate object NeRFs. An output image can be rendered based on the background NeRFs and the object NeRFs. The output image can be rendered based on a selected point of view, an illumination, and a weather condition. The point of view can be selected to render the output image includes a 3D viewing location in x, y, and z location coordinates and direction in θ,φ rotational coordinates. The image segmentor can be a third neural network. The first neural network and the second neural network can include fully connected layers. The background NeRFs and the object NeRFs can be five-dimensional (5D) radiance functions that include the radiance at multiple directions (θ,φ) at a three-dimensional (3D) point (x, y, z), wherein the radiance functions include color, intensity and opacity.

The instructions can include further instructions for rendering the output image to include determining the 5D radiance functions along rays to a selected point of view. The radiance functions can include a location, a direction, an intensity and a color of a selected point. Rendering the output image can include selecting the object included in the output image includes selecting an object location in x, y, and z location coordinates and direction in θ,φ rotational coordinates, selecting an object color, and selecting illumination. Rendering the output image can include rendering the object illumination to match the background scene illumination at different locations of the object. The output images can be output to a second computing system that is used to train a neural network using the rendered output images. The trained neural network can output to a third computing system in a vehicle. Memory included in the third computing system can include instructions that are used to operate the vehicle by determining a vehicle path. The vehicle can be operated by the third computing system by controlling vehicle steering, vehicle propulsion, and vehicle brakes.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate the vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example, e.g., to control one or more of propulsion, steering, and/or braking.

The vehicle 110 is generally a land-based vehicle 110 that may be capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2X interface 111 and computing device 115, and therefore these features will not be described further to avoid redundancy. A server computer 120 can be used to develop and train software that can be transmitted to a computing device 115 in a vehicle 110.

Figure 2:
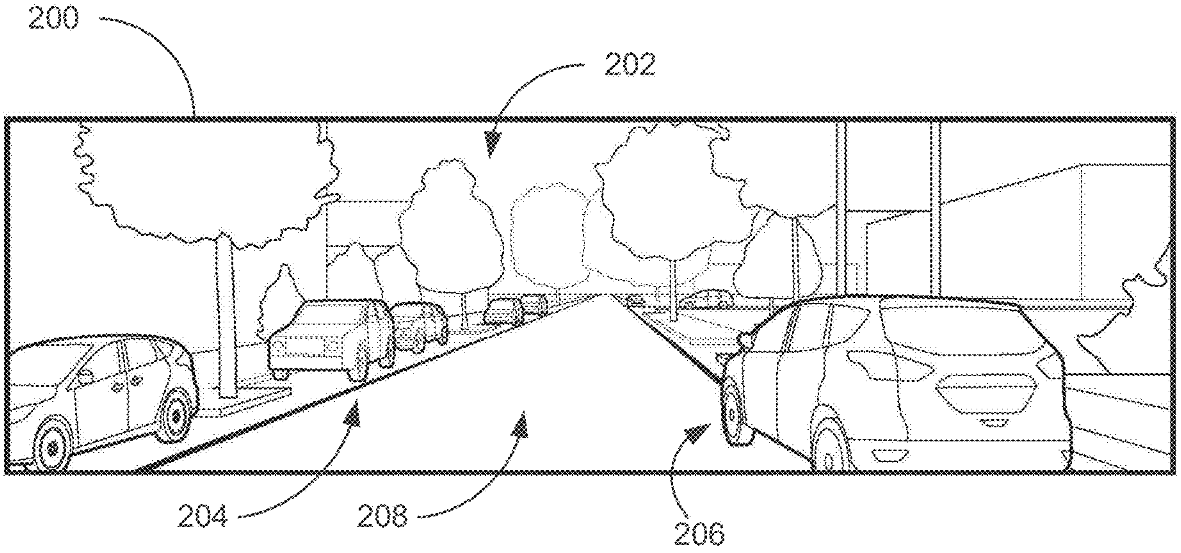
FIG. 2 is a diagram of an example image of a scene.

FIG. 2 is a diagram of an image 200 of scene 202. Image 200 includes a roadway 208 with vehicles 204, 206 parked on both sides of roadway 208. Image 200 can be acquired by a video camera included in a vehicle 110, for example. Image 200 can be acquired as one of a series of frames of video data acquired as vehicle 110, travels on roadway 208 through the scene 202. Sensor 116 included in vehicle 110, for example a GPS sensor, can record the location and orientation of the vehicle 110 at the time each frame of video data is acquired. This can be combined with data regarding the video camera location and orientation with respect to the vehicle 110 to determine the point of view from which each image 200 is acquired. In this context a point of view means the location and orientation of a real or virtual camera lens.

Figure 3:
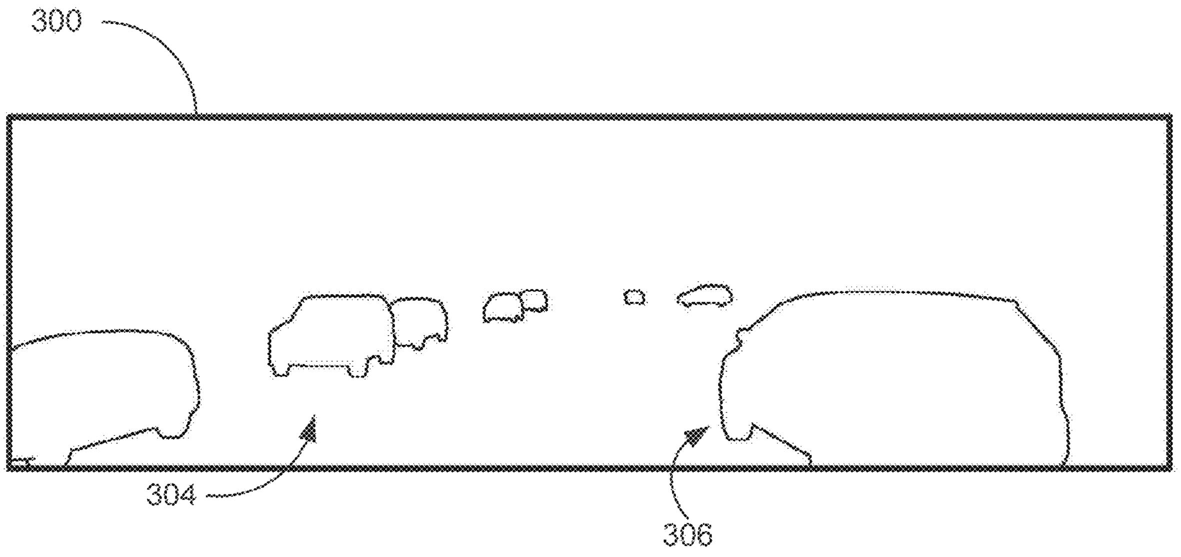
FIG. 3 is a diagram of an example segmented image of a scene.

FIG. 3 is a diagram of a segmented image 300 based on image 200 of scene 202. Segmented image 300 is generated by receiving an input image 200 at an image segmentor 504 as is described in relation to FIG. 5, below. An image segmentor 504 is a software program that can execute on server computer 120, for example. Segmented image 300 can be determined by receiving an input image 200 at an image segmentor 504 that groups pixels into contiguous regions according to edges and pixel values. For example, segmentor 504 can determine edges using an edge detection routine such as a Canny edge detector. The average color value and variance of pixels withing regions of pixels bounded by edges can be determined. Adjacent regions having average values within a user selected variance can be merged to determine a segmented image 300 by determining image segments which group regions of contiguous pixels by color similarity.

An example of image processing software that performs image segmentation is the IntelligentScissorsMB routine in the OpenCV image processing library, located at OpenCV.org as of the filing date of this application. IntelligentScissorsMB uses a watershed algorithm to group pixels by color within edges located using a Canny edge detector. In some examples images can be segmented using a trained neural network to generate a segmented image 300 in a similar fashion to the OpenCV image processing library. Based on the color, size, shape, and location, segmentor 504 can identify individual segments or regions within a segmented image as a particular type of object. For example, segmentor 504 can identify regions as either vehicles 304, 306, or background regions. Segmented image 300 has been filtered to remove all segmented objects except vehicles 304, 306.

Figure 4:
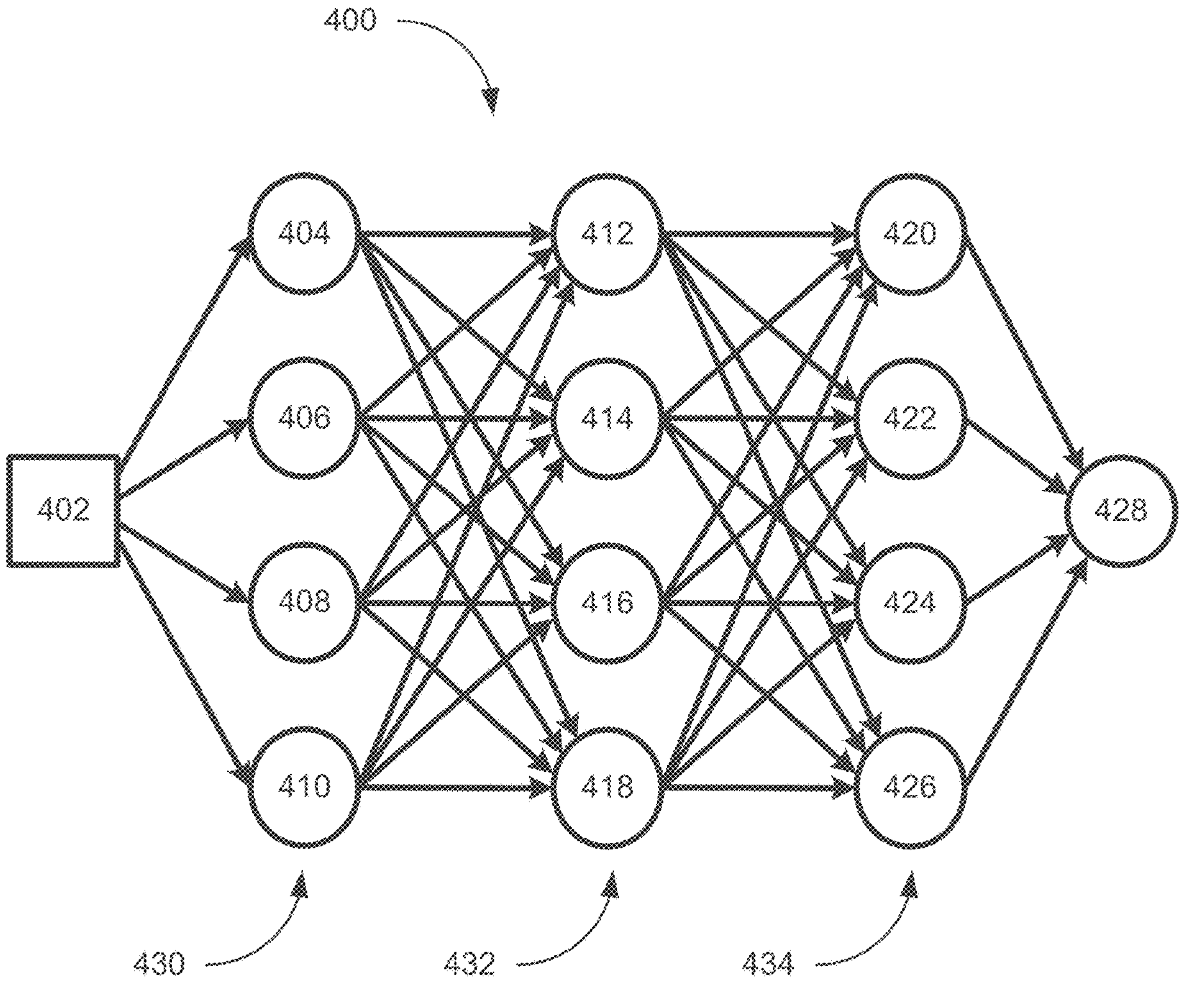
FIG. 4 is a diagram of an example fully connected neural network.

FIG. 4 is a diagram of a fully connected neural network 400. Fully connected neural network 400 includes fully connected layers 430, 432, 434. Fully connected neural network 400 receives as input pixel ray data 402. In this example, pixel ray data 402 identifies a location in 3D space according to a ray projected from an optical center of a camera through a pixel of an acquired image 200 which includes color and intensity. The pixel ray data 402 is generated from segmented image 300 to include only background (non-object) pixels or only object pixels. Fully connected neural network includes input neurons 404, 406, 408, 410 in an input layer 430 which receive input data 402. Input neurons 404, 406, 408, 410 calculate linear and/or non-linear functions on the input data 402 and pass the results onto intermediate neurons 412, 414, 416, 418 in intermediate layer 431. The linear and/or non-linear functions can be selected based on the types of mathematical transformations that would transform the expected input data into the desired output form. Each neuron in the input layer 430 can be connected to each neuron in the intermediate layer 432, hence the designation "fully connected." Fully connected neural network 400 can include multiple intermediate layers 432, each potentially connected to all of the neurons in subsequent intermediate layers 432. The last intermediate layer 434 includes last intermediate neurons 420, 422, 424, 426. Last intermediate neurons 420, 422, 424, 426 are connected to output neuron 428 which outputs the results of fully connected neural network 400 computation.

Pixel ray data 402 also includes real world coordinates of the optical center of the camera at the time the image 200 was acquired. By processing multiple sets of pixel ray data 402 acquired as a camera included in a vehicle 110 passes through a scene, a fully connected neural network 400 can process multiple rays passing through each image pixel and determine the appearance of locations included a scene from multiple angles. By processing multiple sets of pixel ray data 402 acquired at multiple times of day and including data regarding sun angle and intensity, the fully connected neural network 400 can learn to generate locations of shadow and light in the scene for any given time of day and illumination intensity. By processing multiple sets of pixels ray data 402 during differing weather conditions and including data indicating the weather at the time the image data is acquired, fully connected neural network 400 can learn to generate data that includes selected weather conditions.

Fully connected neural network 400 is trained by receiving as input multiple sets of pixel ray data 402 multiple times, generating light-aware NeRFs, reconstructing the light-aware NeRFs to generate a scene from the same location under the same lighting and weather conditions as occurred during acquisition, and comparing the reconstructed scene to the original acquired image 200. Comparing the reconstructed scene to the original image can include subtracting pixel color values in the reconstructed scene from pixel color values in the acquired image 200 and summing the squared differences. The summed, squared differences is a loss function that indicates the accuracy of the generation and reconstruction processes. Because the generation and reconstruction process is differentiable, the loss function can be differentiated to determine the directions to modify the weights that determine the fully connected neural network 400 processing to minimize the loss function.

In this example, a first fully connected neural network 400 receives as input pixel ray data 402 from images 200 in a sequence of images 200 acquired by a vehicle 110 traveling through a scene 202, along with point of view data for each image. A first fully connected neural network 400 can determine light-aware NeRFs, which are five-dimensional (5-D) functions indexed by a three-dimensional (3-D) location in x, y, z real world coordinates and two-dimensional (2-D) θ,φ rotational coordinates. The value of each 5-D function includes a color value and an opacity value. The color value is the color and intensity visible at that 3-D location at that 2-D direction, and the opacity value is a greyscale value that indicates the ability of that point in space to transmit light. The color value and intensity can be encoded using any one of the various color encoding schemes such as red, green, blue (RGB), or hue, saturation, and intensity (HSI), etc. The reconstruction process passes rays through the assembled 5D functions to determine the appearance of the scene from a selected point of view. Light-aware NeRFs for backgrounds can be combined with one or more light-aware NeRFs for one or more objects to reconstruct scenes for selected lighting and weather conditions.

Figure 5:
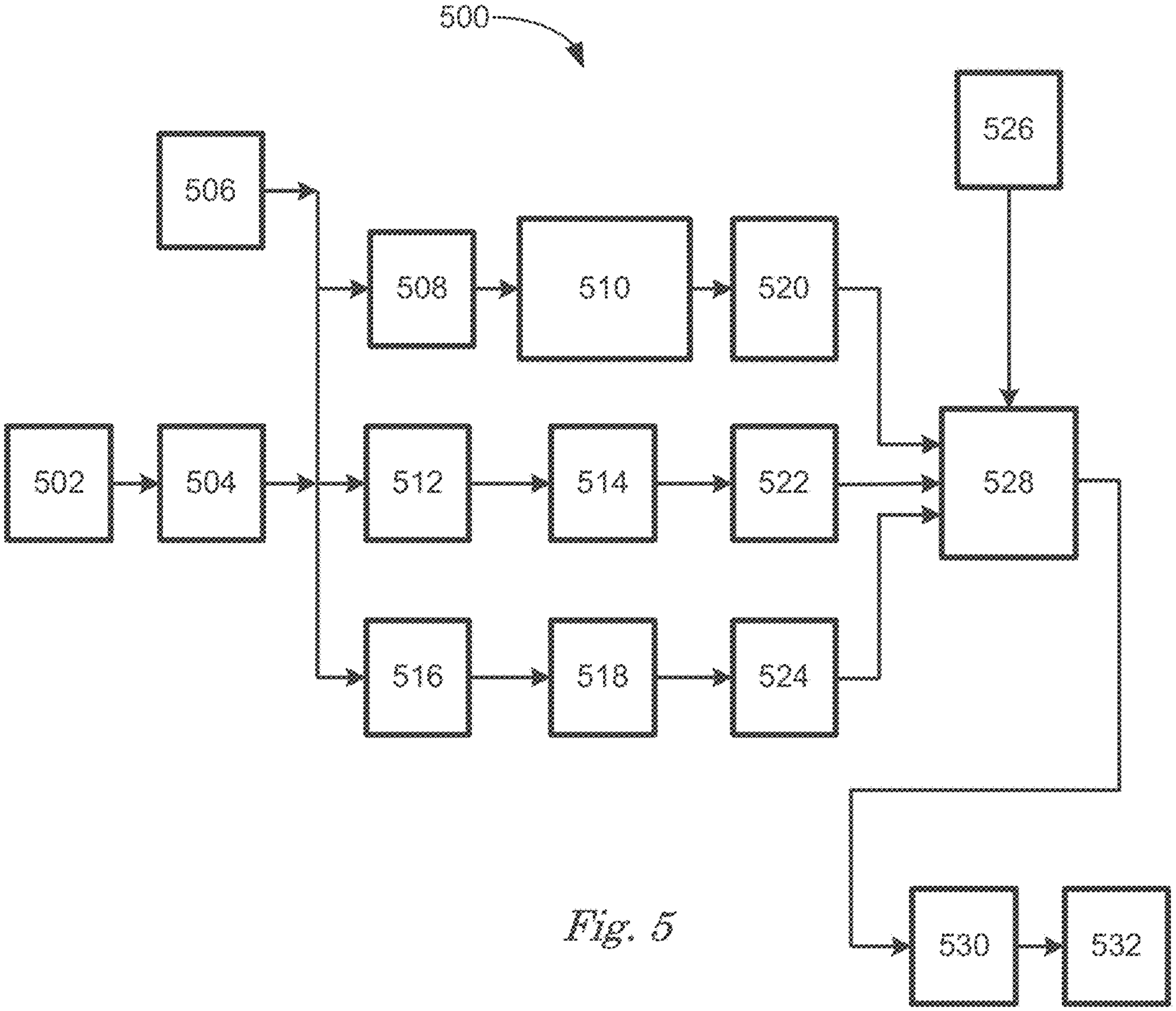
FIG. 5 is a diagram of an example light-aware neural radiance field system.

FIG. 5 is a diagram of a light-aware NeRF system 500 that can receive parameters 506 and images 502, and that can output a reconstructed image 528. Input parameters 506 include appearance codes, frame information, and weather conditions. Appearance codes are latent variables output by intermediate layers 432, 434 of neural network 510 as it processes input data. Latent or hidden variables are data values passed from one layer of a neural network to another layer within the neural network. Appearance codes indicate the overall appearance of a frame of video data including colors, contrast, and brightness, etc. Appearance codes are used to maintain uniform appearance of output images 532. Appearance codes are set to average values to begin processing and are fed back from neural networks 510, 514, 518 and used as input parameters 506 during training to determine final values to be used at inference time.

Input parameters 506 can also include frame data. Frame data can include a time of acquisition and real world location and orientation of the camera that acquired the image 502. The time of acquisition and real world location and orientation of the camera can be used to determine the location of the sun with respect to the image 502 and predict shadows and light in the image 502. Input parameters 506 can also include weather data. Weather data can be acquired from sensors 116 included in vehicle 110 and downloaded from Internet data sources via network 130. Weather data includes precipitation and atmospheric conditions such as fog or dust that can be included in an image 502.

Image 502 is passed to segmentor 504 which segments the image 502, as described above in relation to FIG. 3, into background and object pixels. Segmentor 504 outputs background segments of image 502 to background pixel ray generator 508 and one or more object segments to object pixel ray generators 512, 516, respectively. Pixel ray generators 508, 512, 516 also generate pixel ray data for processing by neural networks 510, 514, 518, respectively. Pixel ray data includes 2D θ,φ rotational coordinates from an optical center of the camera through a pixel address of the image 502, color data and opacity data, both from the pixel addressed by the rotational coordinates. Data regarding the optical center of the sensor and pixel ray data is determined from camera intrinsic parameters which include sensor size and lens focal distance and camera extrinsic parameters which include the 3D location (x, y, and z coordinates) and 2D rotational coordinates (θ,φ coordinates) of the camera in real world coordinates.

Segmentor 504 divides the image 502 data into a set of background pixels and one or more sets of object pixels and transmits the set of background pixels to background pixel ray generator 508 and the one or more sets of object pixels to object pixel ray generators 512, 516, respectively. As described above in relation to FIG. 4, the background pixels can include the scene 202 without vehicles, and the object pixels can include one or more vehicles 204, 206 from the scene 202.

Neural networks 510, 514, 518 process as input a set of background pixel ray data and one or sets of object ray data, respectively, and output background NeRFs 520 and one or more object NeRFs 522, 524. Background NeRFs 520 are 5D functions that specify color, intensity, and opacity of background image segments from a scene 202. Object NeRFs are 5D functions that specify color, intensity, and opacity of object segments from a scene 202. Neural networks 510, 514, 518 are described in relation to FIGS. 6 and 7, below. As described above in relation to FIG. 4, background NeRFs 520, and one or more object NeRFs 522, 524 include 5D functions that describe a 3D volume in terms of colors and densities with respect to 3D viewing locations viewed from multiple directions. The background NeRFs 520, and one or more object NeRFs 522, 524 are output to selector 528 which receives as input rendering data 526 and determines which 5D NeRF functions from the background NeRFs 520, and one or more object NeRFs 522, 524 will be included in the 3D volume to be rendered by renderer 530. Rendering data 526 includes the point of view from which the 3D volume will be rendered, the size of the 3D volume, the sun location and intensity, the weather conditions to be rendered, and locations and orientations of selected objects from the one or more object NeRFs 522, 524. Selector 528 selects which object NeRFs 522, 524 will be included in the 3D volume to be rendered and locates, orients and sizes the object NeRFs 522, 524 based on the rendering point of view selected.

Based on the selected sun angle and intensity data and weather conditions received as input from rendering data 526, selector 528 can condition the color and intensity data included in the 5D NeRF functions for selected background NeRFs 520 and object NeRFs 522, 524. Conditioning the 5D NeRF functions can ensure that the appearance of the rendered object NeRFs 522, 524 matches the appearance of the rendered background NeRFs 520. For example, in a background scene that is rendered in dim lighting, such as early or late on an overcast day, selector 528 determines that vehicles 204, 206 should be rendered with muted colors to match the background.

A 3D volume that includes selected and conditioned background NeRFs 520 and one or more object NeRFs 522, 524 is passed to renderer 530. Renderer 530 is described in relation to FIG. 8, below. Renderer 530 steps through the selected and conditioned background NeRFs 520 and one or more object NeRFs 522, 524 in the 3D volume received from selector 528 and generates pixels of an output image 532 based on the selected point of view, selected objects, selected lighting, and selected weather. One set of background NeRFs 520 and one or more object NeRFs 522, 524 can be used to generate multiple output images 532 by varying the point of view, selection and location of objects, lighting, and weather. This permits light-aware NeRF system 500 to generate image datasets for training neural networks that include images that vary in appearance and content while minimizing computing resources required to generate the image dataset including ground truth.

Figure 6:
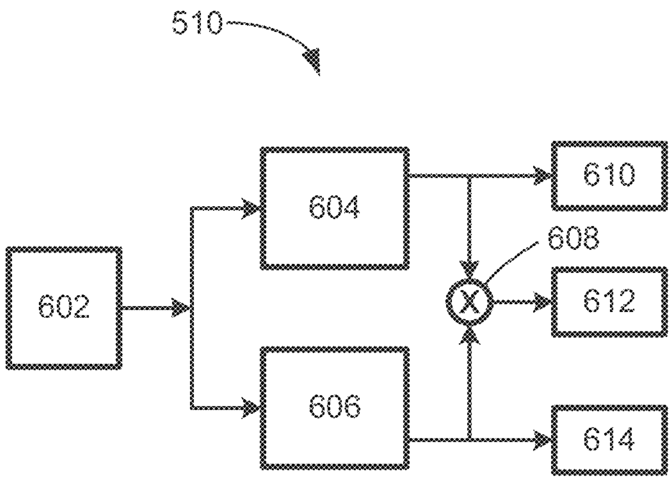
FIG. 6 is a diagram of an example background neural network system.

FIG. 6 is a diagram of a background NeRF neural network system 600. Background NeRF neural network system 600 receives as input pixel ray data 602 including appearance codes, frame data, and weather data. The pixel ray data 602 is divided into position data which is received as input by geometry neural network 604 and lighting data which is received as input by lighting neural network 606. Geometry neural network 604 outputs geometry data 610 which includes the 3D location of pixels in real world coordinates based on multiple sets of input pixel ray data 602 from multiple images acquired as the vehicle passes through a scene. Lighting neural network 606 outputs global lighting features 614 based on the appearance codes, frame data, which includes time of day and illumination data, and weather data.

The geometry data 610 can be combined 608 with the global lighting data 614 to generate 5D shaded color light-aware NeRF data 612 for a selected point of view at a selected time of day with selected weather. The geometry data 610 can be combined 608 with the global lighting data 614 by determining a 5D location and direction based on the geometry data 610. The color and opacity to be assigned to the 5D location and direction can be determined by determining an average color and a variance about the average from the multiple sets of input pixel ray data 602. A large variance can indicate high transparency while a low variance can indicate a low transparency, e.g., a high opacity. For example, a high variance, meaning the color value of the pixel changes by more than 50% between views can indicate that the surface can be highly transparent, such as glass or water, and the view behind the surface is changing as the viewing angle changes. Solid surfaces having a low transparence such as metal, brick, or pavement have low variance, meaning that the color value of the pixel changes smoothly and by less than 10% between adjacent viewing angles, for example. The illumination intensity can be determined based on the global lighting data for the specific point of view, sun location, time of day, and atmospheric conditions, e.g. sunny, overcast, or fog, etc.

Figure 7:
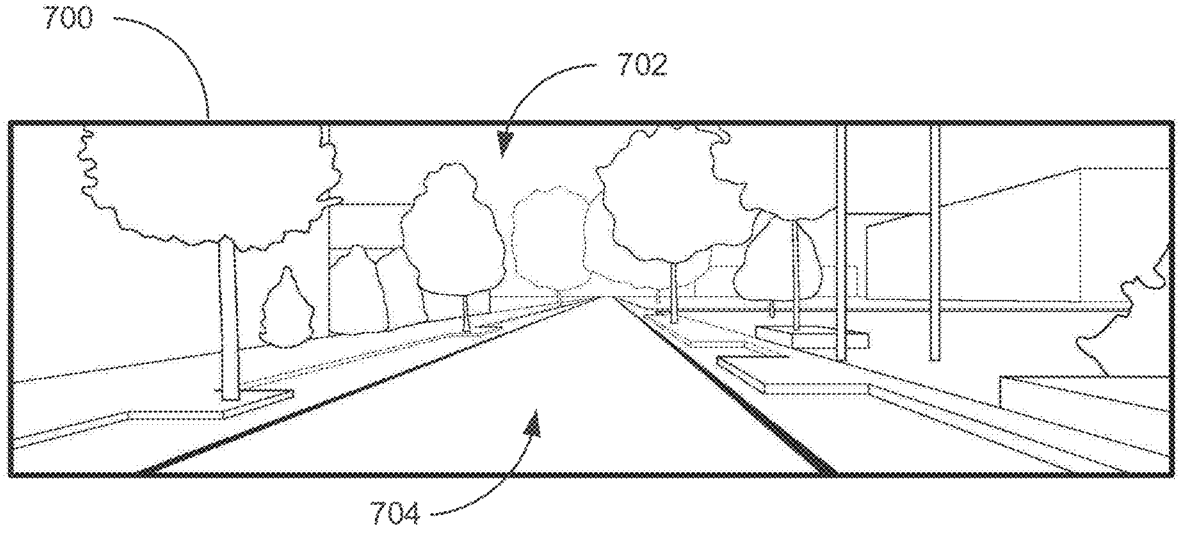
FIG. 7 is a diagram of an example reconstructed scene.

FIG. 7 is a diagram of an image 700 of a scene 702 rendered from 5D shaded color aware NeRF data 612. The image 700 includes a roadway 704 rendered with no vehicles 204, 206, because in this example they have been removed from the pixel ray data 602 received as input by background NeRF neural network 510. The background NeRF neural network 510 can replace pixel data from locations occupied by objects such as vehicle 204, 206 in the input data by inpainting. Inpainting is a technique for generating missing data in images where a neural network copies data from the edges of a missing portion of an image and inserts the copied data towards the center of the missing portion. Rendering 5D shaded color aware NeRF data 612 is described in relation to FIG. 10, below.

Figure 8:
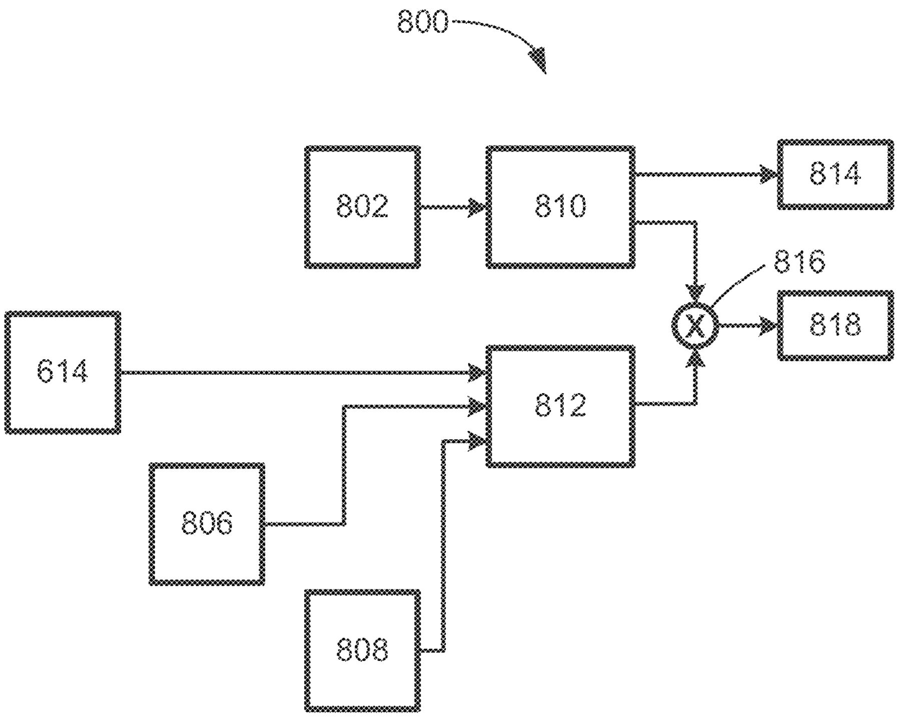
FIG. 8 is a diagram of an example object neural network system.

FIG. 8 is a diagram of an object NeRF neural network 800. Object NeRF neural network 800 can receive as input pixel ray data 802 output by segmentor 504 for a single object such as a vehicle 204, 206. Object neural network 810 can determine object geometry 814 which includes the 3D location of object pixels in real world coordinates based on multiple sets of pixel ray data 602 received as input from multiple images acquired as a vehicle 110 passes through a scene. Object lighting neural network 812 receives as inputs global lighting features 614 output by lighting neural network 606 as described in relation to FIG. 6, above, along with global coordinates for the location 806 and orientation 808 of the object in the final rendered scene.

Object geometry data 814 can be combined 816 with object lighting data output by object lighting neural network 812 to determine 5D shaded color light-aware object NeRF data 818 for each object selected to appear in a final rendered scene. By varying the location and orientation of the object to be rendered, object NeRF neural network 800 can generate 5D shaded color aware object NeRF data 818 for each vehicle to be included in the final rendered scene. Because each 5D shaded color aware object NeRF data 818 set includes geometry data (location 806 and orientation 808), and global lighting features 612 including illumination data and weather conditions, objects such as vehicles can be realistically rendered at multiple different locations and orientations in multiple final rendered scenes.

Figure 9:
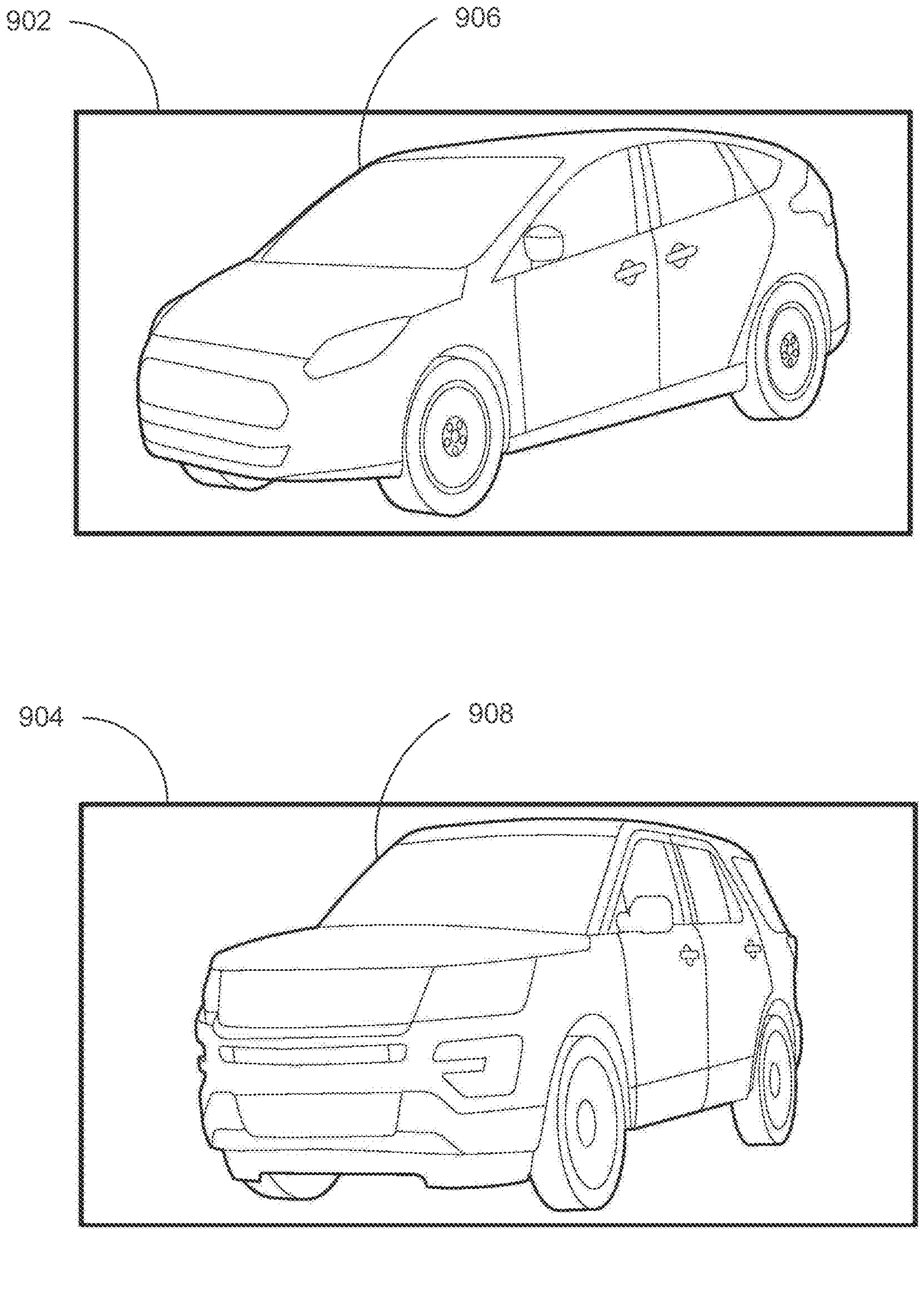
FIG. 9 is a diagram of example reconstructed objects.

FIG. 9 is a diagram of two images 902, 904 that include rendered images of two vehicles 906, 906, respectively. The size, orientation, color, and illumination can be determined by the 5D shaded color light-aware object NeRF data 818 output by object lighting neural networks 812 operating on pixel ray data 512, 516 determined based on image 200 data acquired by a camera included in a vehicle 110 as it passes through a scene 202. By modifying the pixel ray data 602 based on received location 806, orientation 808, and global lighting features 612 including illumination data and weather conditions, object data can be rendered in photo realistic fashion. Photo realistic means that the output rendered image appears as if it were acquired by a camera from a real world scene.

Figure 10:
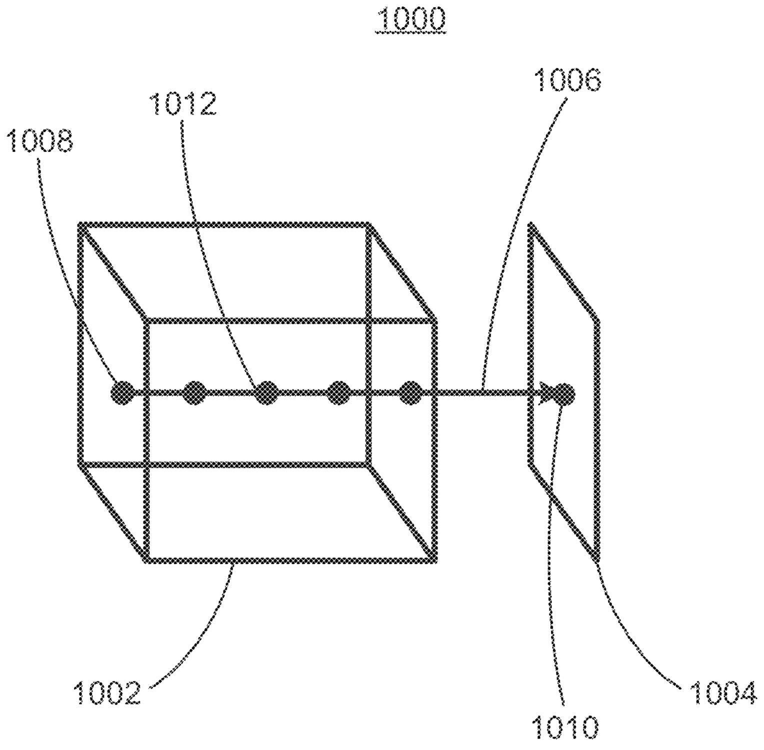
FIG. 10 is a diagram of example image rendering.

FIG. 10 is a diagram of image rendering 1000 as performed by image renderer 526. Image rendering determines an image 1004 by interrogating a 3D volume 1002 that includes 5D shaded color light-aware object NeRF data 1008. The 3D volume 1002 is interrogated by passing a ray 1006 through the 3D volume 1002 to a pixel 1010 included in image 1004. Image rendering 1000 evaluates the 5D shaded color light-aware object NeRF data 1008 at the 3D location and direction indicated by the ray 1006 to determine the color and illumination to place at pixel 1010 of image 1004. Image rendering 1000 steps along the ray 1006, to points along the ray 1006, determining if 5D shaded color light-aware object NeRF data 1012 exists at these points, and, if so, what is the transparency of the 5D shaded color light-aware object NeRF data 1012 at that point. If the 5D shaded color light-aware object NeRF data 1012 is high opacity, meaning low transparency, the color and illumination replaces the previous color and illumination value. If 5D shaded color light-aware object NeRF data 1012 is low opacity, meaning high transparency, such as glass, for example, the color and illumination from 5D shaded color light-aware object NeRF data 1008 can be added to the color and illumination from 5D shaded color light-aware object NeRF data 1012. In this fashion the pixels 1010 of image 1004 can be determined by interrogating the 3D volume 1002 using rays 1006 to intercept 5D shaded color light-aware object NeRF data output by light-aware NeRF system 500 in response to background NeRF 520 and selected object NeRFs 522, 524.

Figure 11:
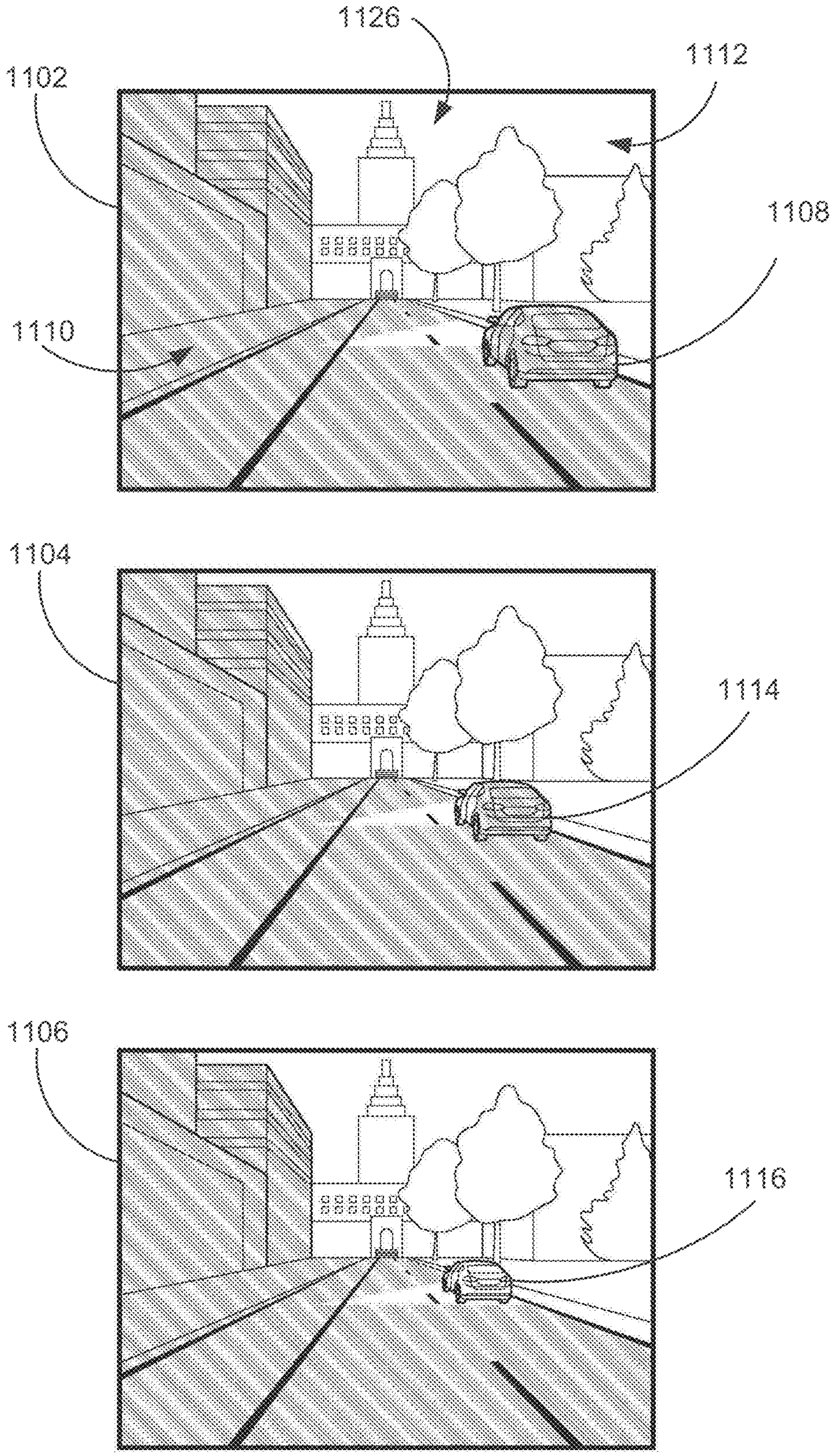
FIG. 11 is a diagram of example reconstructed scenes.

FIG. 11 is a diagram of three images 1102, 1104, 1106, rendered according to light-aware NeRF techniques described herein. The images 1102, 1104, 1106 include a background scene 1126, rendered to include shadow 1110 and light 1112 illumination. In image 1102 a vehicle 1108 has been rendered to appear at a location that is fully in shadow 1110 and has fully shaded illumination. In image 1104 the rendered vehicle 1114 has moved to a second location. The size and shading have changed due to the difference in location with respect to the global illumination of the scene 1126. The shading of rendered vehicle 1114 is now partially illuminated by light 1112. In image 1106, rendered vehicle 1116 smaller and fully illuminated by light 1112. The three images 1102, 1104, 1106 illustrate light-aware NeRF techniques rendering a single background with an object at different locations with different illuminations due to global illumination of the scene 1126. Light-aware NeRF techniques permit objects such as vehicle 1108 to be rendered so that the illumination of the object matches the illumination of a background scene 1126 including shadow 1110 and light 1112 while the object is moved to different locations in the background scene 1126.

Figure 12:
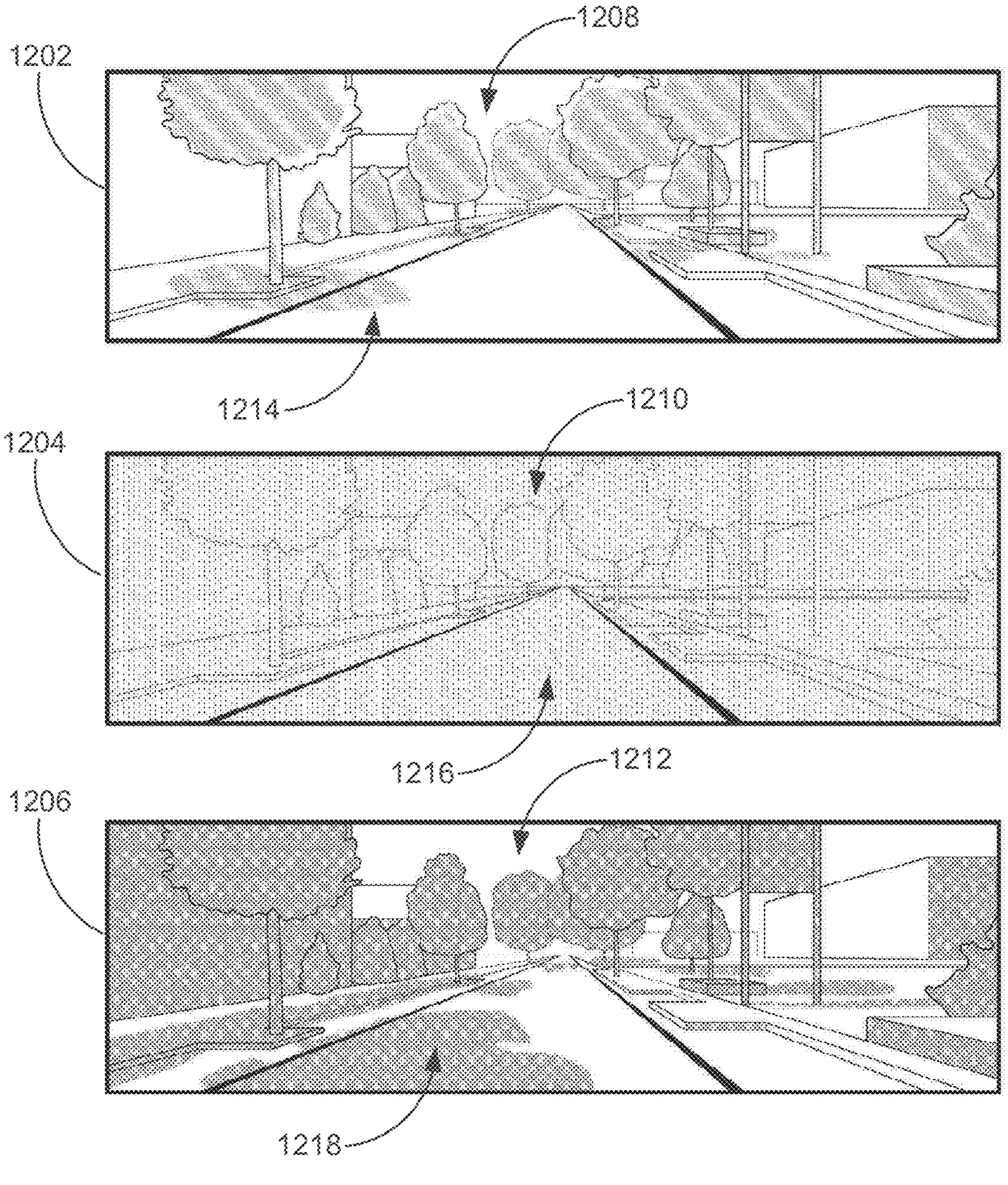
FIG. 12 is a diagram of further example reconstructed scenes.

FIG. 12 is a diagram of three images 1202, 1204, 1206 illustrating respective global illumination and weather conditions. The three images 1202, 1204, 1206 each include a background scene 1208, 1210, 1212, respectively, rendered under differing illumination and weather conditions. Image 1202 illustrates a background scene 1208 rendered with overcast mid-day lighting which produces low contrast between shadows 1214 and background scene 1208. Image 1204 illustrates a background scene 1210 rendered with rain 1216 weather conditions. The rain 1216 produces low overall contrast in the background scene 1210. Image 1206 illustrates a background scene 1212 rendered with bright afternoon sunlight, which produces large shadows 1218 having strong contrast with the background scene 1212.

Images 1202, 1204, 1206 can be rendered from a single background NeRF 520 dataset. The light-aware NeRF system 500 can be trained based on multiple sets of training images 200 acquired at different times of day during different weather conditions. The times of day along with data regarding the sun position at that time and data regarding the weather conditions present while the images 200 are acquired is incorporated in the training of light-aware NeRF system 500. Inputting time of day data which indicates the sun location along with weather conditions that indicate the amount of direct sunlight (clear, overcast, sunrise/sunset, etc.) and atmospheric conditions (rain, snow, fog, dust, etc.) is used by the light-aware NeRF system 500 to determine the color and intensity of light at each 5D function determined by the light-aware NeRF system 500.

Figure 13:
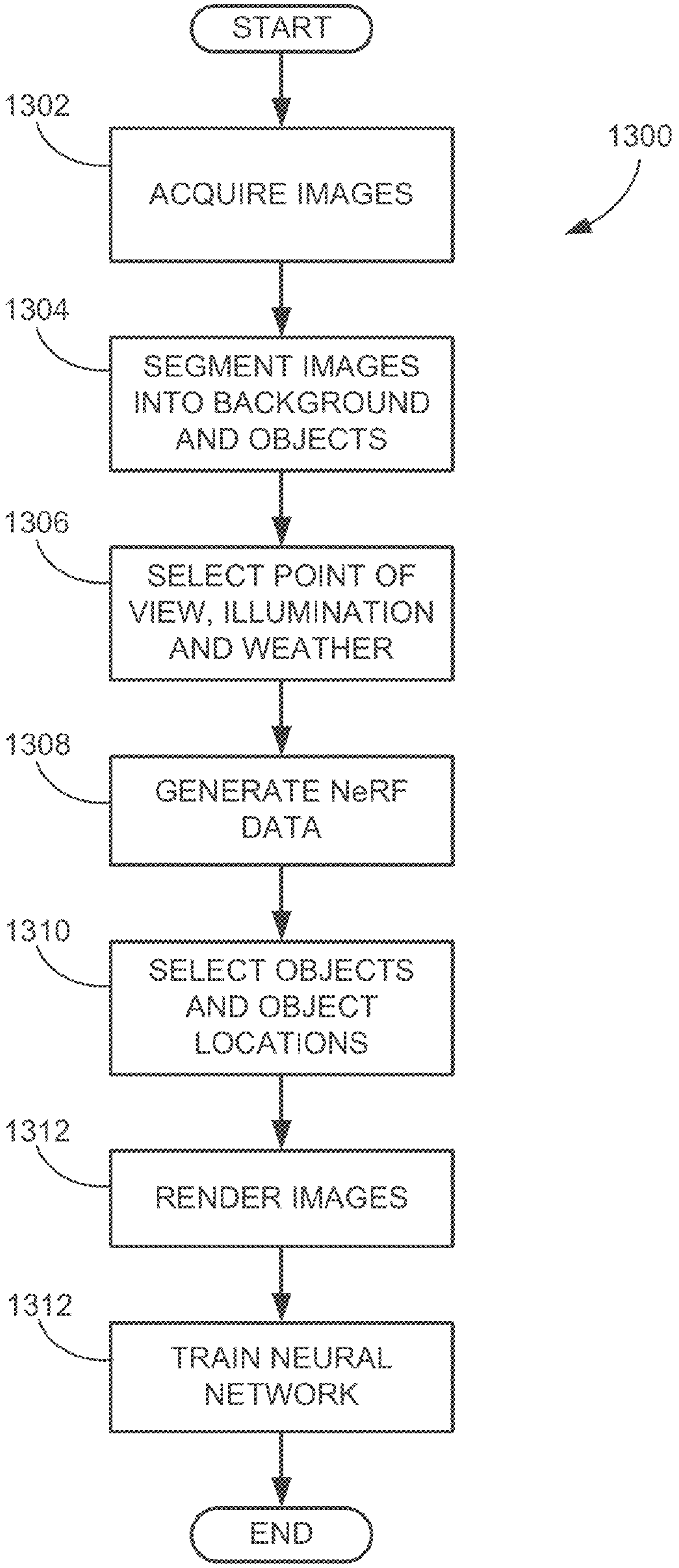
FIG. 13 is a flowchart diagram of an example light-aware neural radiance field system.

FIG. 13 is a flowchart of a process 1300 for generating a rendered image 528 of a scene 1126, 1208, 1210, 1212. Process 1300 can be implemented in a server computer 120, for example. Process 1300 includes multiple blocks that can be executed in the illustrated order. Process 1300 could alternatively or additionally include fewer blocks or can include the blocks executed in different orders.

Process 1300 begins at block 1302 where a computing device 115 in a vehicle 110 acquires images 502 from a sensor 116, which can be a video camera included in the vehicle 110. The images 502 include data regarding an environment around the vehicle 110. Images 502 can include objects such as one or more other vehicles. Computing device 115 can transmit the images 502 to a server computer 120 via a network 130.

At block 1304 the images 502 are input to a light-aware NeRF system 500 that can input the images 502 executing on the server computer 120. The images 200 are input to a segmentor 504 which segments the images 502 into background pixel ray data and one or more sets of object pixel ray data as discussed above in relation to FIGS. 4 and 5.

At block 1306 a 5D point of view, a time of day including sun location and weather conditions including illumination and atmospheric conditions are selected and input to light-aware NeRF system 500.

At block 1308 the pixel ray data generated by pixel ray generators 508, 512, 516 are input to neural networks 510, 514, 524, respectively, to determine background NeRFs 520 and one or more object NeRFs 522, 524, respectively as discussed above in relation to FIG. 5. NeRFs are 5D functions that identify the color and intensity of light as a function of 3D location and 2D direction.

At block 1310 one or more object NeRFs 522, 524 along with object color, locations and orientations are selected for inclusion in the final rendered image 528 as described in relation to FIGS. 5-9, above.

At block 1310 one or more images 528 are rendered based on the background NeRF 520 and the one or more object NeRFs 522, 524 as described in relation to FIG. 10, above.

At block 1312 a neural network can be trained based on the rendered output images 528 generated by the light-aware NeRF system 500. As described above in relation to FIG. 5, because the location and orientation of the objects included in the images 528 is determined prior to rendering the images 528, ground truth required to train the neural network is available with no further processing of the images 528. Following block 1312 process 1300 ends.

Figure 14:
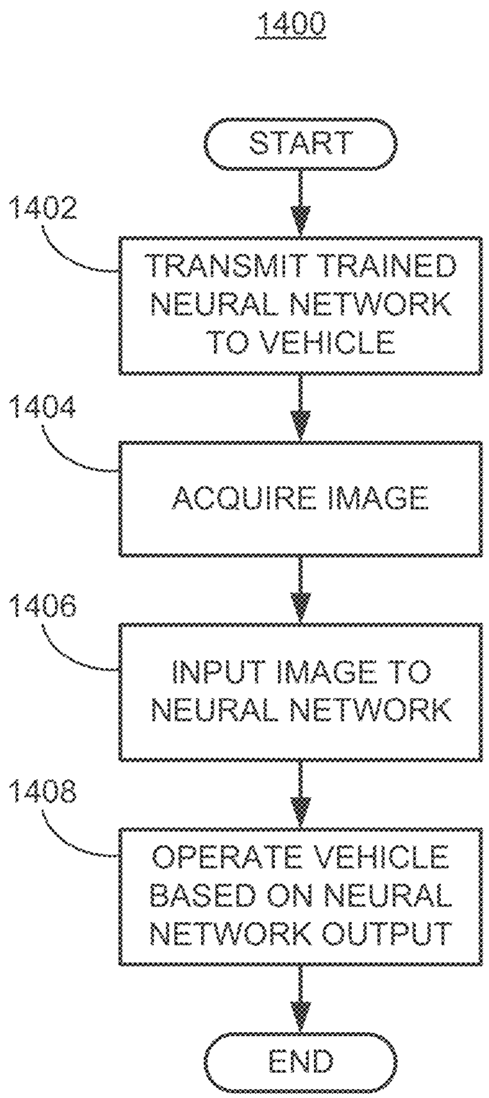
FIG. 14 is a flowchart diagram of an example process to operate a vehicle based on training a neural network with a light-aware neural radiance field system.

FIG. 14 is a flowchart of a process 1400 for operating a vehicle 110 based on an object detected by a neural. Process 1400 can be implemented by computing device 115 included in a vehicle 110. Process 1400 includes multiple blocks that can be executed in the illustrated order. Process 1400 could alternatively or additionally include fewer blocks or can include the blocks executed in different orders.

Process 1300 begins at block 1402, where a server computer 120 transmits a copy of a neural network trained using images 528 and ground truth generated by a process 1300 as described in relation to FIG. 13, above, to a computing device 115 in a vehicle 110.

At block 1404 the computing device 115 acquires an image from a sensor 116, which can be a video camera included in the vehicle 110, for example. The image can include data regarding an environment around the vehicle 110 including an object, which, when detected, could assist the computing device 115 in operating the vehicle 110.

At block 1406 computing device 115 inputs the image to the trained neural network. The neural network processes the image and outputs a prediction, which can include a location and label indicated by the object included in the input image.

At block 1408 computing device 115 operates a vehicle 110 based on the prediction output by the trained neural network. For example, when the prediction includes an object with the label "vehicle" the computing device 115 can determine a vehicle path that maintains a predetermined distance from the detected vehicle. The vehicle 110 can be operated by determining a vehicle path by determining a path polynomial function which maintains minimum and maximum limits on lateral and longitudinal accelerations. A vehicle 110 can be operated along a vehicle path by transmitting commands to controllers 112, 113, 114 to control vehicle propulsion, steering and brakes. Following block 1408 process 1400 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:

a computer that includes a processor and a memory, the memory including instructions executable by the processor to:

generate background pixels and object pixels, wherein the object pixels include first object pixels based on a first object and second object pixels based on a second object;

generate background pixel ray data based on the background pixels and first object pixel ray data based on the first object pixels and second object pixel ray data based on the second object pixels;

input the background pixel ray data to a first neural network to generate background neural radiance fields (NeRFs);

input the first object pixel ray data to a second neural network to generate first object NeRFs and input the second object pixel ray data to a fourth neural network to generate second object NeRFs; and render an output image based on the background NeRFs wherein a background NeRF neural network replaces pixel data from locations occupied by the first object pixels and the second object pixels by inpainting and render the first object NeRFs and the second object NeRFs based on an illumination and a weather condition at locations, sizes, and orientations in the output image that are different than the locations of the first object pixels and the second object pixels.

2. The system of claim 1, the instructions including further instructions to render the output image based on a selected point of view and the locations, sizes, and orientations at which the first object NeRFs and the second object NeRFs are rendered.

3. The system of claim 2, wherein the point of view selected to render the output image includes a 3D viewing location in x, y, and z location coordinates and direction in θ,φ rotational coordinates.

4. The system of claim 1, wherein the image segmentor is a third neural network.

5. The system of claim 1, wherein the first neural network, the second neural network, and the fourth neural network include fully connected layers.

6. The system of claim 1, wherein the background NeRFs, first object NeRFs and the second object NeRFs are five-dimensional (5D) radiance functions that include the radiance at multiple directions (θ,φ) at a three-dimensional (3D) point (x, y, z), wherein the radiance functions include color, intensity and opacity.

7. The system of claim 6, wherein rendering the output image includes determining the 5D radiance functions along rays to a selected point of view.

8. The system of claim 7, wherein the radiance functions include a location, a direction, an intensity and a color of a selected point.

9. The system of claim 1, wherein rendering the output image includes:

selecting the first object to be included in the output image which includes selecting a first object location in x, y, and z location coordinates and direction in θ,φ rotational coordinates, selecting a first object colors, and selecting first object illumination; and selecting the second object to be included in the output image which includes selecting a second object location in x, y, and z location coordinates and direction in θ,φ rotational coordinates, selecting second object colors, and selecting second object illumination.

10. The system of claim 9, wherein rendering the output image includes rendering the first object illumination and second object illumination to match the background scene illumination at different locations of the first object.

11. The system of claim 1, wherein the output images are output to a second computing system that is used to train a neural network using the rendered output images.

12. The system of claim 11, wherein the trained neural network is output to a third computing system in a vehicle.

13. The third computing system of claim 12, wherein memory included in the third computing system includes instructions that are used to operate the vehicle by determining a vehicle path.

14. A method, comprising:

generating background pixels and object pixels, wherein the object pixels include first object pixels based on a first object and second object pixels based on a second object;

generating background pixel ray data based on the background pixels and first object pixel ray data based on the first object pixels and second object pixel ray data based on the second object pixels;

inputting the background pixel ray data to a first neural network to generate background neural radiance fields (NeRFs);

inputting the first object pixel ray data to a second neural network to generate first object NeRFs and inputting the second object pixel ray data to a fourth neural network to generate second object NeRFs; and rendering an output image based on the background NeRFs wherein a background NeRF neural network replaces pixel data from locations occupied by the first object pixels and the second object pixels by inpainting and render the first object NeRFs and the second object NeRFs based on an illumination and a weather condition at locations, sizes, and orientations in the output image that are different than the locations of the first object pixels and the second object pixels.

15. The method of claim 14 wherein rendering the output image is based on a selected point of view, and the locations, sizes, and orientations at which the first object NeRFs and the second object NeRFs are rendered.

16. The method of claim 15, wherein the point of view selected to render the output image includes a 3D viewing location in x, y, and z location coordinates and direction in $\theta,\varphi$ rotational coordinates.

17. The method of claim 14, wherein the image segmentor is a third neural network.

18. The method of claim 14, wherein the first neural network, the second neural network, and the fourth neural network include fully connected layers.

19. The method of claim 14, wherein the background NeRFs, first object NeRFs and the second object NeRFs are five-dimensional (5D) radiance functions that include the radiance at multiple directions $(\theta,\varphi)$ at a three-dimensional (3D) point (x, y, z), wherein the radiance functions include color, intensity and opacity.

20. The method of claim 19, wherein rendering the output image includes determining the 5D radiance functions along rays to a selected point of view.

* * * * *